US010742473B1

(12) United States Patent
James et al.

(10) Patent No.: US 10,742,473 B1
(45) Date of Patent: Aug. 11, 2020

(54) ENHANCED SIGNAL ACQUISITION BASED ON ADAPTIVE MULTIRESOLUTION MODULATION

(71) Applicant: United States of America as represented by the Secretary of the Navy, San Diego, CA (US)

(72) Inventors: Justin O'Neal James, San Diego, CA (US); Michael Patrick Daly, San Diego, CA (US)

(73) Assignee: United States Government as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 16/592,641

(22) Filed: Oct. 3, 2019

(51) Int. Cl.
| H04L 27/36 | (2006.01) |
|---|---|
| H04L 27/34 | (2006.01) |
| H04B 17/15 | (2015.01) |
| H04B 1/06 | (2006.01) |
| H04L 12/24 | (2006.01) |
| H04B 1/02 | (2006.01) |
| H04L 27/38 | (2006.01) |

(52) U.S. Cl.
CPC ........... H04L 27/3488 (2013.01); H04B 1/02 (2013.01); H04B 1/06 (2013.01); H04B 17/15 (2015.01); H04L 27/36 (2013.01); H04L 27/38 (2013.01); H04L 41/0816 (2013.01)

(58) Field of Classification Search
CPC ............ H04L 27/3405; H04L 27/3422; H04L 27/3444; H04L 27/3488; H04L 27/36; H04L 27/366; H04L 27/38; H04L 41/0816; H04B 1/02; H04B 1/06; H04B 17/15

See application file for complete search history.

(56) References Cited

U.S. PATENT DOCUMENTS

| 5,852,630 | A * | 12/1998 | Langberg ............ H04L 27/2647 375/219 |
|---|---|---|---|
| 6,658,059 | B1 | 12/2003 | Iu et al. |
| 8,249,374 | B2 | 8/2012 | Short et al. |
| 8,270,511 | B2 * | 9/2012 | Barsoum ................ H04B 15/00 375/261 |
| 9,036,694 | B2 * | 5/2015 | Zhou ..................... H04L 1/0003 375/240.01 |
| 9,953,246 | B2 | 4/2018 | Bouchard et al. |
| 2008/0152141 | A1 | 6/2008 | Short et al. |

(Continued)

OTHER PUBLICATIONS

Hierarchical constellation for multi-resolution data transmission over block fading channels by M.J. Hossain, published on Apr. 2006 (Year: 2006).*

(Continued)

Primary Examiner — Siu M Lee
(74) Attorney, Agent, or Firm — Naval Information Warfare Center Pacific; Kyle Eppele; J. Eric Anderson

(57) ABSTRACT

A transmitter in a network transmits transmissions in accordance with an asymmetric signal constellation. A channel impairment in the network is detected. In response, a transmitter adjustment value for adjusting modulations at the transmitter is determined, the transmitter adjustment value determined to increase asymmetry of the asymmetric signal constellation. Signal acquisition may be improved by transmitting, at the transmitter, transmissions, based on transmitting using the determined transmitter adjustment value.

15 Claims, 13 Drawing Sheets

(56) References Cited

U.S. PATENT DOCUMENTS

2011/0096814 A1* 4/2011 Wu .................. H04L 27/2604
　　　　　　　　　　　　　　　　　　　375/219
2017/0064519 A1* 3/2017 Li ......................... H04L 12/18
2019/0305996 A1* 10/2019 Handte ................ H04L 5/0044

OTHER PUBLICATIONS

J. James et al., "Adaptive Multiresolution Modulation for Multimedia Traffic over Nakagarni Fading Channels," International Journal of Wireless & Mobile Networks (Apr. 2012), pp. 1-20.

K. Yang et al., "Unequal Error Protection for Streaming Media Based on Rateless Codes," IEEE Transactions on Computers, vol. 61 No. 5, May 2012, pp. 666-675.

Odejide et al., "Adaptive Multiresolution Modulation for Multimedia Traffic in Dynamic Wireless Environment," 34th IEEE Sarnoff Symposium, May 3-4, 2011, 6 pages.

J. James et al., "Adaptive Multiresolution Modulation for Multimedia Traffic," IEEE Consumer Communications and Networking Conference (CCNC) (Jan. 9-12, 2012), pp. 697-698.

* cited by examiner

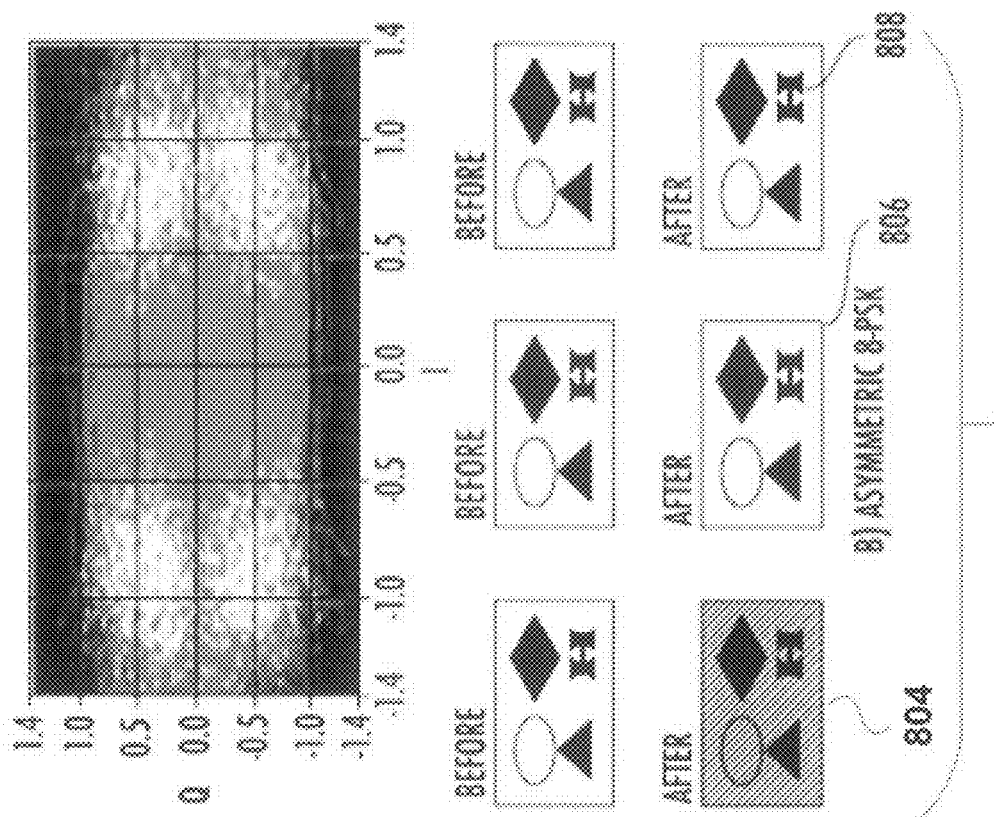
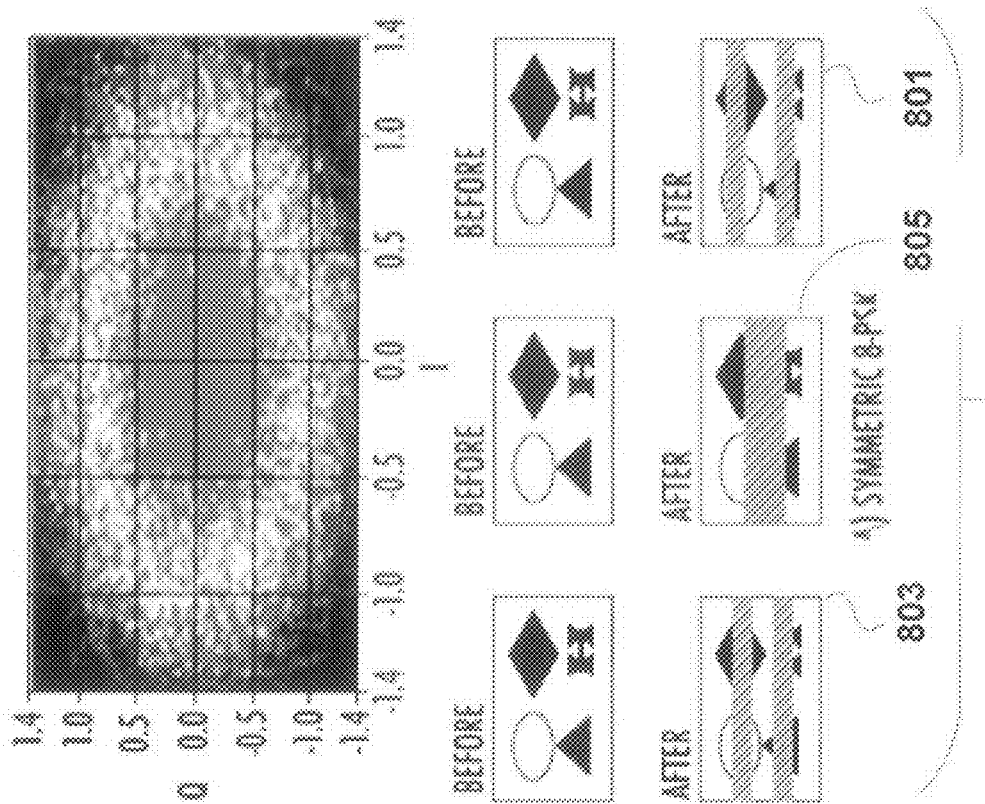
FIG. 9A
FIG. 9B

A) SYMMETRIC (NO FADING)

B) SYMMETRIC (WITH FADING)

C) ASYMMETRIC (WITH FADING)

ENHANCED SIGNAL ACQUISITION BASED ON ADAPTIVE MULTIRESOLUTION MODULATION

FEDERALLY-SPONSORED RESEARCH AND DEVELOPMENT

The United States Government has ownership rights in this invention. Licensing inquiries may be directed to Office of Research and Technical Applications, Naval Information Warfare Center, Pacific, Code 72120, San Diego, Calif., 92152; telephone (619)553-5118; email: ssc_pac_t2@navy.mil. Reference Navy Case No. 104,068.

BACKGROUND

Quality of signal acquisition in networks is an ongoing concern in most networking environments. Much research is devoted to determining techniques for improving signal acquisition.

In network transmissions, Adaptive Multiresolution Modulation (AMM) permits adaptation of both the shape (β) and the size of an asymmetric signal constellation. The spectral efficiency gain achieved through the employment of AMM at the physical layer (of the Open Systems Interconnection model) may be substantial (e.g., up to fifty percent (50%) increase), especially at low and moderate carrier-to-noise ratio (CNR) (see, e.g., J. James et al., "Adaptive Multiresolution Modulation for Multimedia Traffic over Nakagami Fading Channels," International Journal of Wireless & Mobile Networks (April 2012), pp. 1-20 ("James 1" hereinafter) and J. James et al., "Adaptive Multiresolution Modulation for Multimedia Traffic," IEEE Consumer Communications and Networking Conference (Jan. 9-12, 2012), pp. 697-698 ("James 2" hereinafter)).

At the physical layer, there are three techniques that may facilitate Unequal Error Protection (UEP): 1) increase the transmission power while sending high priority bits; 2) use channel coding with varying levels of error protection; and/or 3) employ a suitable multiresolution (hierarchical) modulation scheme.

An example technique using UEP is discussed in K. Yang, et al., "Unequal Error Protection for Streaming Media Based on Rateless Codes," IEEE Transactions on Computers, vol. 61 no. 5, pp. 666-675, May 2012 ("Yang" hereinafter).

As further explanation of constellations, a constellation diagram is a representation of a signal modulated by a digital modulation scheme such as quadrature amplitude modulation or phase-shift keying. The diagram represents the signal as a two-dimensional xy-plane scatter diagram in the complex plane at symbol sampling instants. The angle of a point, measured counterclockwise from the horizontal axis, represents the phase shift of the carrier wave from a reference phase. The distance of a point from the origin represents a measure of the amplitude or power of the signal.

In a digital modulation system, information may be transmitted as a series of samples, each occupying a uniform time slot. During each sample, the carrier wave has a constant amplitude and phase which may be restricted to one of a finite number of values, so each sample encodes one of a finite number of "symbols", which in turn represent one or more binary digits (bits) of information. Each symbol may be encoded as a different combination of amplitude and phase of the carrier, so each symbol may be represented by a point on the constellation diagram. The constellation diagram may represent all the possible symbols that can be transmitted by the system as a collection of points. In a frequency or phase modulated signal, the signal amplitude is constant, so the points lie on a circle around the origin.

The carrier representing each symbol can be created by adding together different amounts of a cosine wave representing the "I" or in-phase carrier, and a sine wave, shifted by 90° from the I carrier called the "Q" or quadrature carrier. Thus, each symbol may be represented by a complex number, and the constellation diagram may be regarded as a complex plane, with the horizontal real axis representing the I component and the vertical imaginary axis representing the Q component. A coherent detector may independently demodulate these carriers. The principle of using two independently modulated carriers is the foundation of quadrature modulation. In pure phase modulation, the phase of the modulating symbol is the phase of the carrier itself.

A "signal space diagram" refers to an ideal constellation diagram showing the correct position of the point representing each symbol. After passing through a communication channel, due to electronic noise or distortion added to the signal, the amplitude and phase received by the demodulator may differ from the correct value for the symbol. When plotted on a constellation diagram the point representing that received sample may be offset from the correct position for that symbol. For example, a vector signal analyzer can display the constellation diagram of a digital signal by sampling the signal and plotting each received symbol as a point. The result is a "ball" or "cloud" of points surrounding each symbol position. For example, measured constellation diagrams may be used to recognize the type of interference and distortion in a signal.

SUMMARY

Disclosed herein is a method and system for improving signal acquisition. According to one embodiment of the signal acquisition method, a transmitter in a network transmits transmissions in accordance with an asymmetric signal constellation. A channel impairment in the network is detected. In response, a transmitter adjustment value for adjusting modulations at the transmitter is determined, the transmitter adjustment value determined to increase asymmetry of the asymmetric signal constellation. Signal acquisition may be improved by transmitting, at the transmitter, transmissions, based on transmitting using the determined transmitter adjustment value.

The signal acquisition method may also be described as comprising the following steps. One step provides for receiving, at a network receiver, from a transmitter, a first receiver adjustment value corresponding to a first transmitter adjustment value. The network receiver may be configured to demodulate signals received from the transmitter, in accordance with an asymmetric signal constellation, based on the first transmitter adjustment value. At the network receiver, a transmission may be received from the transmitter. The received transmission may be demodulated, based on demodulating using the received first receiver adjustment value corresponding to the first transmitter adjustment value. A second receiver adjustment value corresponding to a second transmitter adjustment value may be received, the second transmitter adjustment value based on increasing asymmetry of the asymmetric signal constellation. Signal acquisition may be improved by demodulating, at the network receiver, transmissions, based on demodulating using the received second receiver adjustment value.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. The details of one or more implementations are set forth in the accompanying drawings and the description below. Other features will be apparent from the description and drawings, and from the claims.

BRIEF DESCRIPTION OF THE DRAWINGS

FIGS. 9A and 9B illustrate the received I-Q constellation graph and thumbnail images at SNR=6 dB for 8-PSK.

DETAILED DESCRIPTION

Figure 1:
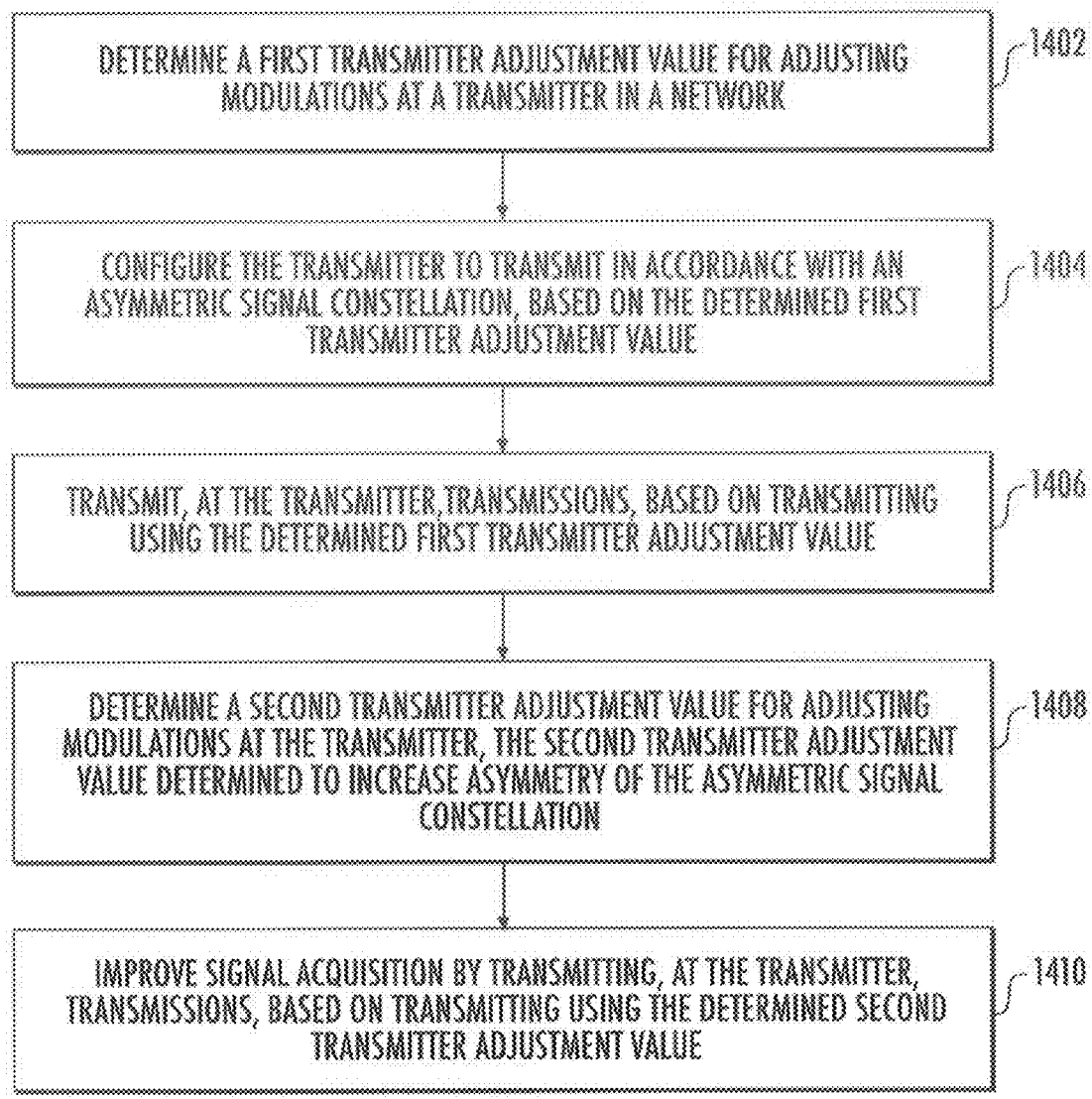
FIG. 1 is a flowchart of an embodiment of a method for improving signal acquisition.
Figure 14:
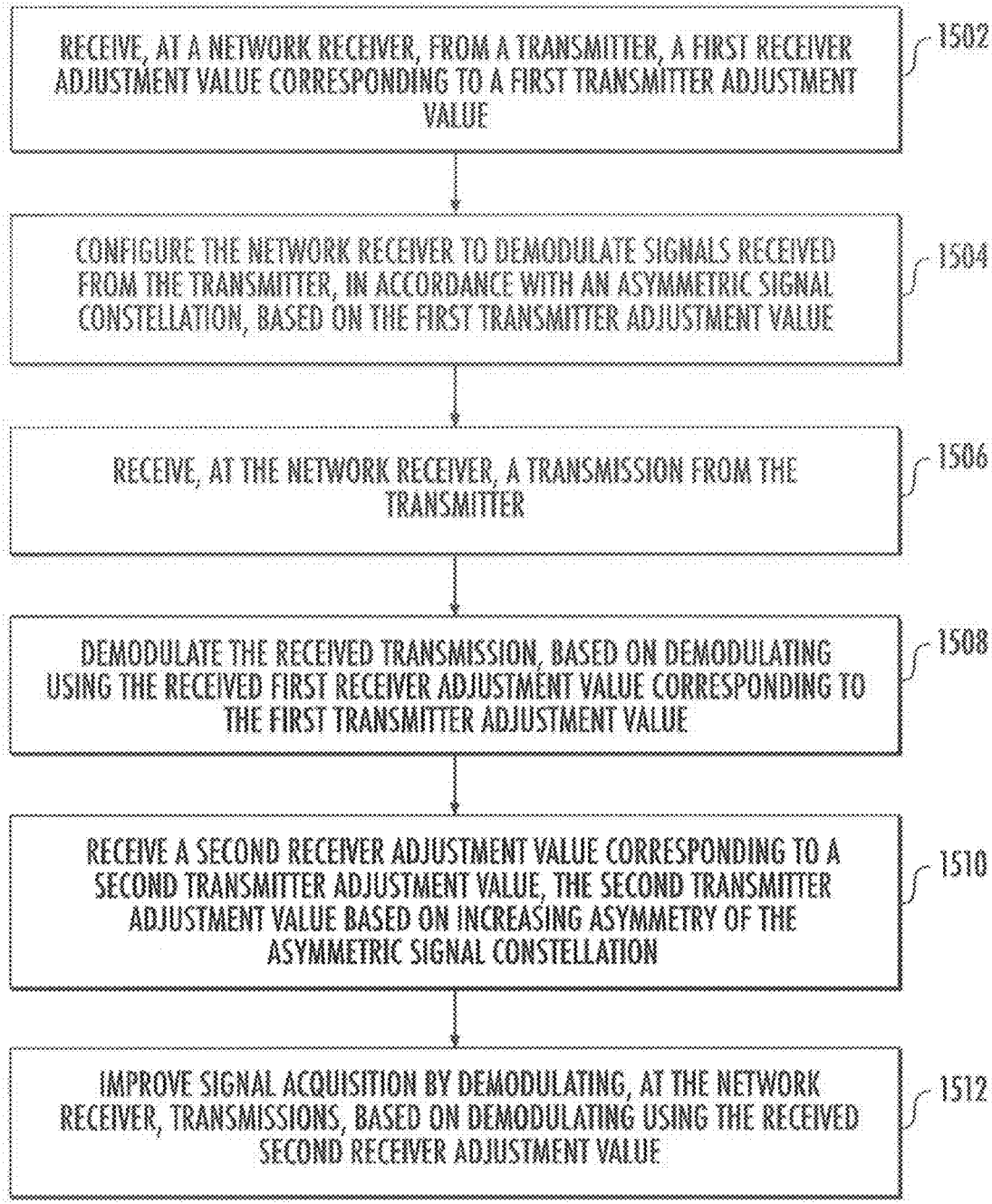
FIG. 14 is a flowchart illustrating example operations of the system of FIG. 2, according to example embodiments.

FIG. 1 is a flowchart of an embodiment of a method 100 for improving signal acquisition. As shown in the example of FIG. 14, a transmitter in a network (such as the transceiver 26 shown in FIG. 3) transmits transmissions in accordance with an asymmetric signal constellation (1402). A channel impairment in the network may be detected (1404).

In response to detecting the channel impairment, a transmitter adjustment value for adjusting modulations at the transmitter may be determined, the transmitter adjustment value determined to increase asymmetry of the asymmetric signal constellation (1406). Signal acquisition may be improved by transmitting, at the transmitter, transmissions, based on transmitting using the determined transmitter adjustment value (1408).

For example, the transmitter may be configured to transmit in accordance with the transmitter adjustment value.

For example, increasing the asymmetry of the asymmetric signal constellation may include modifying a shape of a current signal constellation in use for transmitting at the transmitter. For example, increasing the asymmetry of the asymmetric signal constellation may include modifying a size of a current signal constellation in use for transmitting at the transmitter.

For example, improving the signal acquisition may include transmitting, at the transmitter, transmissions, based on transmitting using the determined transmitter adjustment value, in lieu of increasing power. For example, the transmitter may transmit in accordance with adaptive multiresolution modulation.

For example, the asymmetric signal constellation may be based on a representation of signals modulated by a digital modulation scheme.

An embodiment of the signal acquisition method 100 enhances signal acquisition in the presence of channel impairments by making the transmitted modulation constellation more asymmetric. In the presence of channel impairments, the likelihood of signal acquisition may be increased through modulation constellation shape pre-distortion instead of increasing power. Using AMM for enhanced signal acquisition allows a radio to save energy and establish the communications link. Once the radio receiver is able to lock-in frequency, phase, and time using the asymmetric modulation, less asymmetric modulation, symmetric modulation, and/or higher order modulation may be used by interpolating the known frequency, phase, and time offset.

A performance gain is achieved by mapping higher priority buffer bits to higher protected bit positions within the symbol and other bits to less protected bit positions, enabling partial modulated symbol recovery. Because of the partial modulated symbol recovery facilitated, AMM may avoid the "cliff effect" in which all data transmission cuts out when the channel becomes very poor. Instead, there may be a graceful degradation and the most important data may still be sent through all but the worst channel outages.

Utilizing the UEP facilitated by AMM, asymmetrical modulation may be used for signal acquisition under poor channel conditions. Adaptive forward error correction (FEC) may also enable UEP (see, e.g., Yang). However, the benefits of FEC may only be realized once the signal has been successfully acquired in terms of frequency, phase, and time by the radio receiver. Consequently, only UEP via AMM may be used to increase the likelihood of signal acquisition devoid using additional power or bandwidth.

Figure 2:
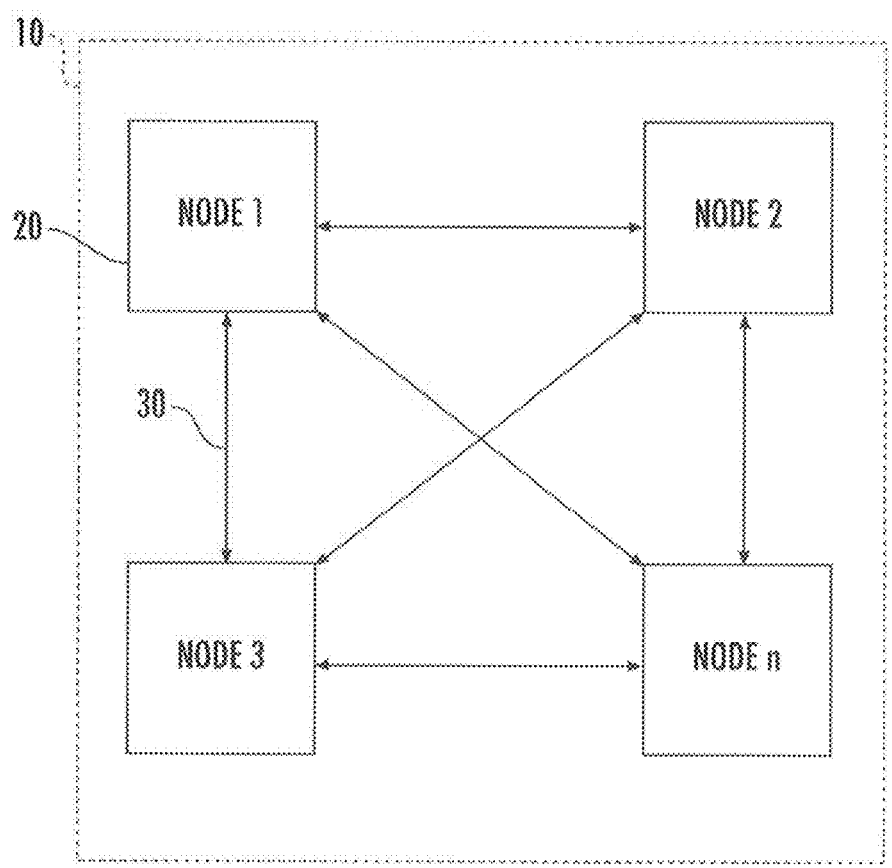
FIG. 2 is a block diagram of an example system having a distributed network architecture.

FIG. 2 is a block diagram of an example system 10 having a distributed network architecture that may be used to implement the signal acquisition method 100. System 10 may include a plurality of nodes 20 that are each configured to send signals 30 to each of the other nodes 20 and receive signals 30 from each of the other nodes 20. Nodes 20 may be organized in any type of distributed network configuration. In some embodiments, nodes 20 are fixed in their location within the network. In some embodiments, nodes 20 are mobile and are able to move about within the network. In some embodiments, system 10 may include both fixed and mobile nodes. In some embodiments, nodes 20 comprise sensors that may be used to detect objects within an environment.

Figure 3:
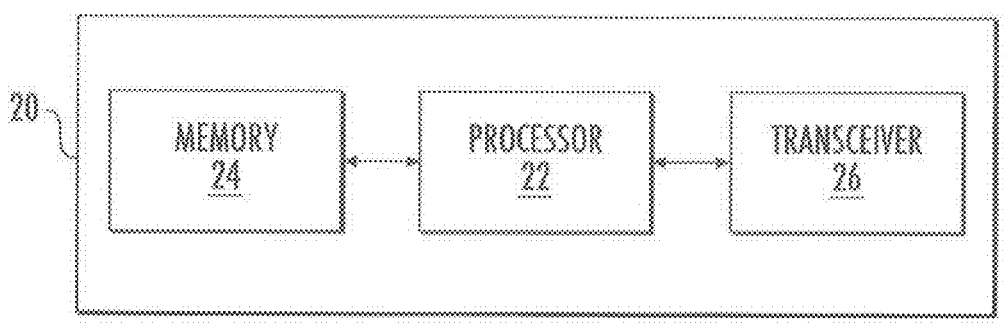
FIG. 3 is a block diagram of an example node in the distributed network architecture shown in FIG. 1.

FIG. 3 is a block diagram of an example of a node 20. As shown, node 20 includes a processor 22 operatively connected to a memory unit 24 and a transceiver 26. In some embodiments, processor 22 is a general purpose processor. In some embodiments, processor 22 is a processor that is specifically programmed to contain instructions therein, readable by the processor, that allow the processor to send/receive information to/from memory unit 24 and transceiver 26, as well as to cause transceiver 26 to send/receive signals in accordance with embodiments discussed herein. Further, depending on the particular application of the node, e.g., a sensor, node 20 may include more components therein to allow the node to perform functions required by the specific application.

Figure 4A:
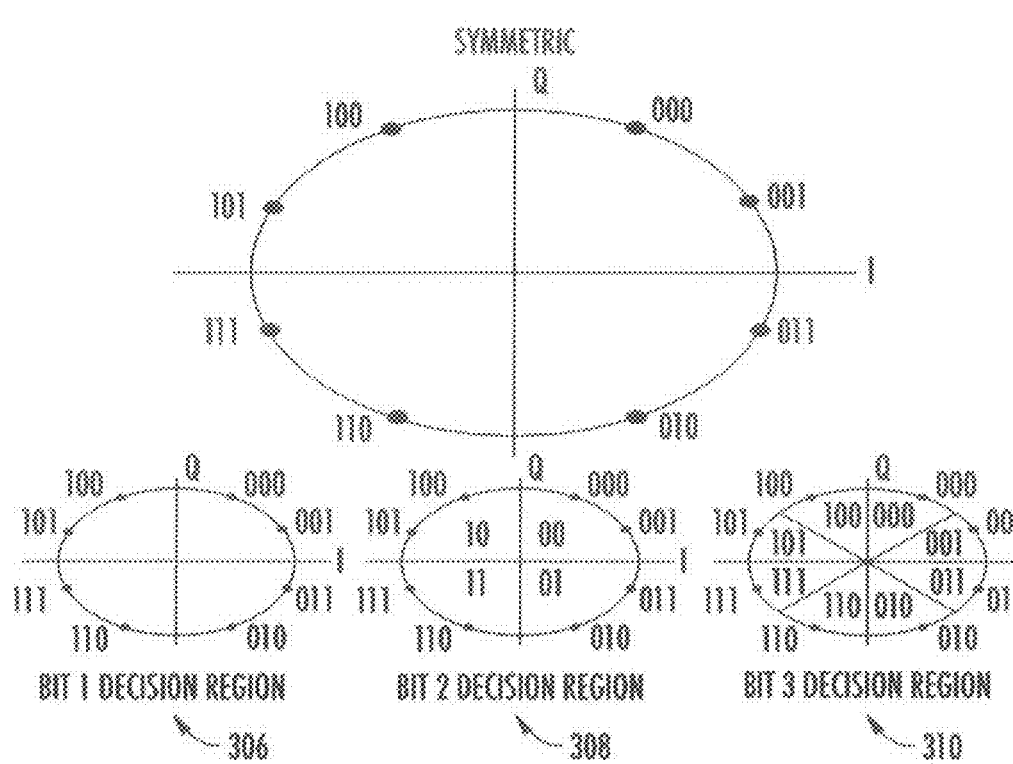
FIG. 4A is a constellation diagram of symmetric 8-PSK.
Figure 4B:
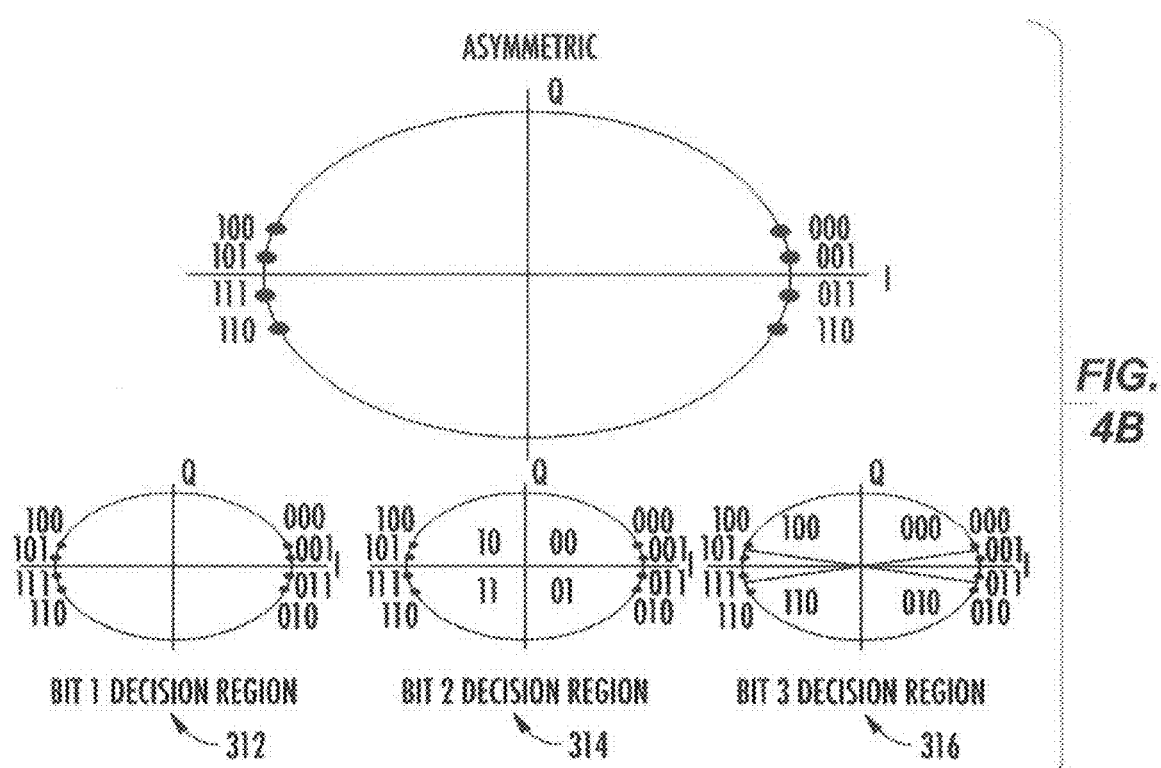
FIG. 4B is a constellation diagram of asymmetric 8-PSK.

At a receiver, demodulation, symbol-to-bit translation, may be based on pre-defined decision regions. FIGS. 4A and 4B illustrates a comparison of Symmetric 8-phase-shift keying (PSK) (FIG. 4A) and Asymmetric 8-PSK (FIG. 4B), as shown by constellation diagrams. In FIGS. 4A and 4B, the decision regions for bit 1, bit 2, and bit 3 for both symmetric and asymmetric 8-PSK are shown. As shown in FIG. 4A, decision region 306 illustrates the decision region for bit 1 for symmetric 8-PSK, decision region 308 illustrates the decision region for bit 2 for symmetric 8-PSK, and decision region 310 illustrates the decision region for bit 3 for symmetric 8-PSK. As shown in FIG. 4B, decision region 312 illustrates the decision region for bit 1 for asymmetric 8-PSK, decision region 314 illustrates the decision region for bit 2 for asymmetric 8-PSK, and decision region 316 illustrates the decision region for bit 3 for asymmetric 8-PSK. If the transmitted symbol is received in the correct decision region, the symbol may be demodulated correctly. If the transmitted symbol is received in the incorrect decision region due to attenuation, noise, interference, or some other phenomena, the symbol may be demodulated erroneously. Consequently, transmitted symbols closer to the decision region boundary may need less corruption to be received in the incorrect decision region and are more likely to be received in error.

The adaptive demodulation scheme is based on a maximum likelihood (ML) detection rule for each bit. As shown in FIGS. 4A and 4B, for the 8-PSK constellations, the first bit, also known as the most significant bit (MSB), is "0" in the right half plane and "1" in the left half plane. Moreover, if the phase angle between the symbol and the positive x-axis ($\phi$) is between $-(\pi/2)<\phi<(\pi/2)$, "0" may be assigned to the first bit. Similarly, the second bit which represents the next most significant is "0" in the upper half plane and "1" in the lower half plane. The complete set of decision rules employed by the demodulator for asymmetric 8-PSK modulation may be denoted as:

(a) For $1^{st}$ bit: If $-(\pi/2)<\phi<(\pi/2)$, $i_1=0$; else $i_1=1$.
(b) For $2^{nd}$ bit: If $0<\phi<\pi$, $i_2=0$; else $i_2=1$.
(c) For $3^{rd}$ bit: If $(\pi/2)\beta<\phi<\pi-(\pi/2)\beta$ or $-\pi+(\pi/2)\beta<\phi<-(\pi/2)\beta$, $i_3=0$; else $i_3=1$.

Figure 5A:
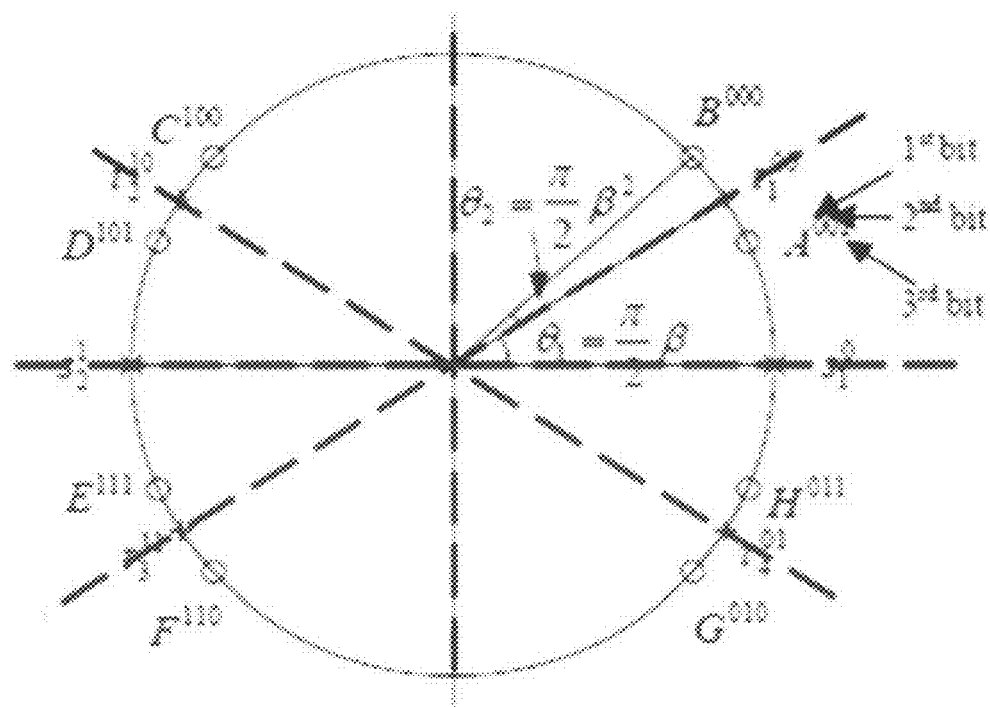
FIG. 5A illustrates an asymmetric 8-PSK constellation.
Figure 5B:
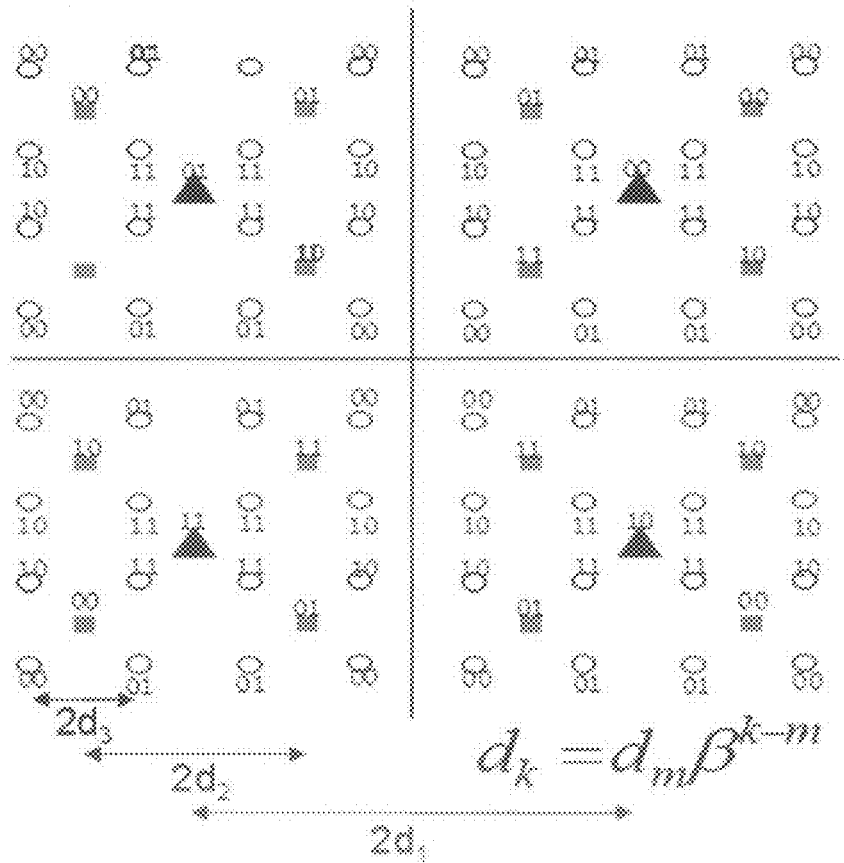
FIG. 5B illustrates a 4/16/64 QAM constellation.

FIG. 5A illustrates an symmetric 8-PSK constellation. FIG. 5B illustrates a 4/16/64 quadrature amplitude modulation (QAM) constellation. If the transmitter adapts the shape ($\beta$) of the constellation, then as shown in FIGS. 5A and 5B, the decision regions will correspondingly change at a receiver. AMM may permit adaptation of both the shape and the size of the asymmetric signal constellation, improving the throughput for multi-service data while fulfilling distinct Quality of Service (QoS) packet error rate (PER) requirements for each traffic type under different channel conditions.

It may be noted that for asymmetric modulation, ML decoding is performed on individual bits instead of the received symbol. This may facilitate partial symbol recovery, which increases spectral efficiency and throughput under disadvantaged channel conditions. For symmetric modulation, ML decoding may be executed on the received symbol. Consequently, there is no partial symbol recovery (meaning that either all of the bits or none of the bits are demodulated correctly). Thus, asymmetric modulations may be decoded with lower uncoded BERs (Bit Error Rates) than can symmetric modulations in the low to moderate signal-to-noise ratio (SNR)/CNR regions.

For symmetric 8-PSK, all of the constellation symbols are equidistant in the signal space. Thus, for symmetric 8-PSK, the BER and PER characteristics of each bit are roughly the same. For asymmetric 8-PSK, as the constellation becomes more asymmetric, bit 1 is farther from the decision region and less vulnerable to corruption. However, bit 2 and especially bit 3 may move closer to the decision regions and more vulnerable to corruption. In essence, asymmetric modulation provides more protection to the MSB(s) at the expense of less protection of the least significant bit(s) (LSB(s)).

Using asymmetric modulation, the receiver may more easily perform signal acquisition (frequency, phase, and time lock), because the MSB is more protected and may be more easily demodulated. LSBs may benefit from this because the frequency, phase, and time offset is the same as the MSB which may more easily be determined. Consequently, signal acquisition may be enhanced for asymmetric modulation.

Emulated over-the-air performance of AMM was characterized using two Universal Software Radio Peripherals (USRPs) and a Spirent SR5500 Wireless Channel Emulator. One USRP was used as an AMM transmitter. Another USRP was used as an AMM receiver. The SR5500 wireless channel emulator was used to accurately emulate complex wideband wireless channel characteristics such as time-varying multipath, fading, and channel loss. The SR5500 enabled a thorough, structured approach to receiver performance characterization through a programmable and repeatable set of emulated radio channel conditions. The SR5500 replicates real-world deployment conditions using powerful digital signal processing techniques, enabling the isolation of performance issues early in development and design verification process.

For Quadrature Phase Shift Keying (QPSK), at SNR>10 dB (decibels), the BER for all levels of asymmetry ($\beta$) is zero. For $\beta=0.5$ (symmetric modulation), the BERs for bit 1 and bit 2 are roughly the same for a given SNR. As the modulation constellation becomes more asymmetric, for $\beta=0.4$ and $\beta=0.3$, the UEP between bit 1 and bit 2 becomes more apparent. At SNR=6 dB, for $\beta=0.5$, bit 1 and bit 2 encounter several bit errors. At the same SNR, for $\beta=0.4$ and $\beta=0.3$, bit 1 has approximately the same BER. However, bit 2 is received error-free. At SNR=3 dB, a similar trend is observed. For the asymmetric modulations, bit 2 is more protected than bit 1. As $\beta$ is decreased and the constellation becomes more asymmetric, the UEP disparity between bit 1 and bit 2 increases. At SNR=1 dB, the performance is substantially degraded for all $\beta$ values (0.3 through 0.5) tested. For this SNR level, nearly half of all the received bits for both bit classes are erroneous. However, even in this degraded state, for $\beta=0.4$ and $\beta=0.3$, bit 2 has fewer errors than bit 1. Table 1, shown below, lists the BERs recorded for each case tested for QPSK.

TABLE 1

BER measured over the air for QPSK for an attenuated path loss channel.

| SNR | $\beta = 0.5$ | | $\beta = 0.4$ | | $\beta = 0.3$ | |
|---|---|---|---|---|---|---|
| (dB) | Bit 1 | Bit 2 | Bit 1 | Bit 2 | Bit 1 | Bit 2 |
| 20 | 0.00E+00 | 0.00E+00 | 0.00E+00 | 0.00E+00 | 0.00E+00 | 0.00E+00 |
| 15 | 0.00E+00 | 0.00E+00 | 0.00E+00 | 0.00E+00 | 0.00E+00 | 0.00E+00 |
| 10.5 | 0.00E+00 | 0.00E+00 | 0.00E+00 | 0.00E+00 | 0.00E+00 | 0.00E+00 |
| 6 | 7.04E−03 | 6.26E−03 | 5.57E−03 | 0.00E+00 | 3.70E−03 | 0.00E+00 |
| 3 | 3.33E−02 | 1.72E−02 | 2.16E−02 | 9.77E−03 | 1.83E−02 | 1.36E−03 |
| 1 | 4.94E−01 | 4.91E−01 | 3.81E−01 | 2.96E−01 | 4.74E−01 | 1.59E−01 |

Figure 6:
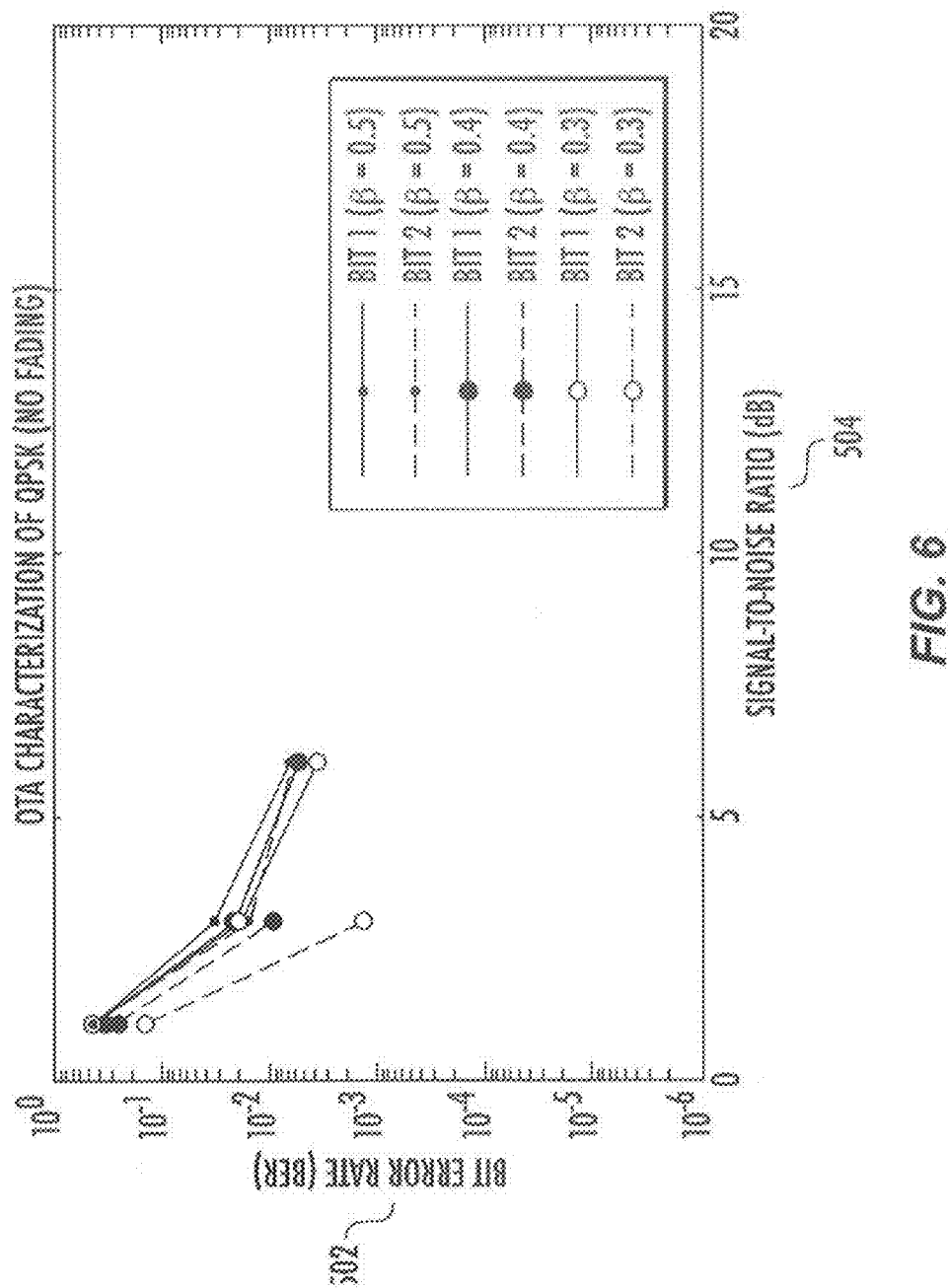
FIG. 6 illustrates an over-the-air BER characterization of symmetric and asymmetric QPSK (no fading).

FIG. 6 illustrates an over-the-air BER characterization of symmetric and asymmetric QPSK (no fading). As shown in FIG. 6, BER (502) decreases as SNR (504) increases, with different bits showing differing levels of BER.

Figure 7B:
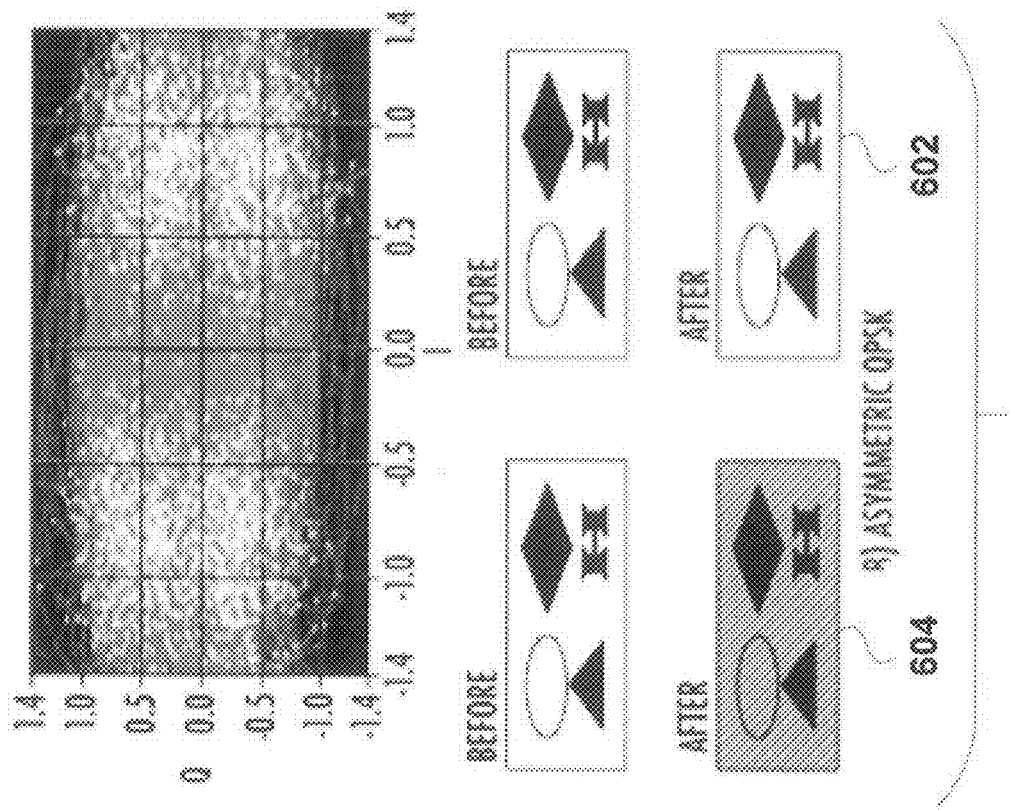
FIGS. 7A and 7B illustrate the received I-Q constellation graph and thumbnail images at SNR=6 dB for QPSK.
Figure 7A:
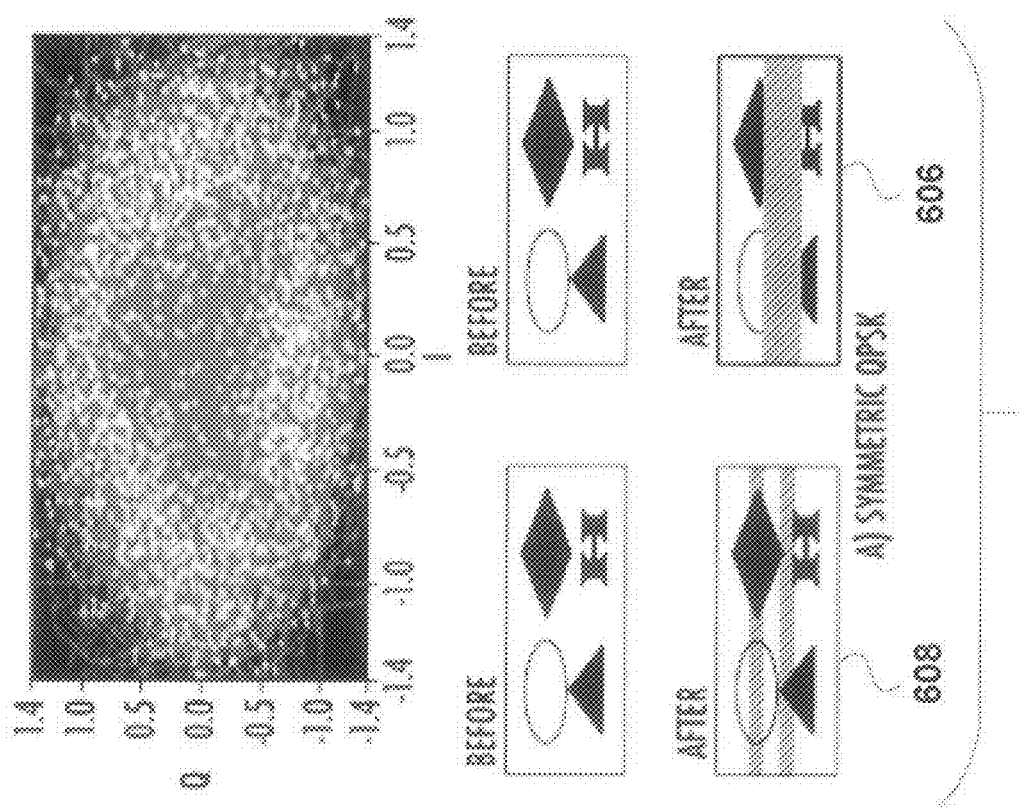

FIGS. 7A and 7B depict the received I-Q constellation graph and thumbnail images at SNR=6 dB for QPSK for different values. As shown, FIGS. 7A and 7B illustrate received I-Q Constellation graphs and thumbnail images for a) Symmetric QPSK, $\beta$=0.5 (7A) and b) Asymmetric QPSK, $\beta$=0.3 (SNR=6 dB) (7B). In FIGS. 7A and 7B, from the I-Q constellation graphs, it may be observed that the received constellation using asymmetric modulation ($\beta$=0.3) (7B) is less affected by the attenuation than the symmetric modulation ($\beta$=0.5) (FIG. 7A). As a result, the thumbnail images 602 and 604 received using asymmetric modulation have a much higher perceived quality than the thumbnail images 606 and 608 received using symmetric modulation. For the symmetric constellation, the receiver method of failure is an inability to maintain frequency and phase lock. Consequently, the constellation rotation causes bit flipping which inverts light and dark. For the asymmetric constellation, in all but the worst cases, frequency and phase lock is maintained because the most protected bit stream is easily demodulated.

For 8-PSK, at SNR=20 dB, the BER for all $\beta$ values is zero. For $\beta$=0.5, the BERs for bit 1, bit 2, and bit 3 are roughly the same for a given SNR. As the modulation constellation becomes more asymmetric, for $\beta$=0.4 and $\beta$=0.3, the UEP between bit 1, bit 2, and bit 3 increases. At SNR=15 dB, for $\beta$=0.5, bit 1, bit 2, and bit 3 are received error-free. At the same SNR, for $\beta$=0.4 and $\beta$=0.3, bit 3 is received error free. However, bit 1 and bit 2 encounter errors. In the case of the asymmetric modulations, bit 3 receives more protection at the expense of less protection for bit 1 and bit 2. However, bit 3 is already adequately protected. Thus, the asymmetry may have little to no effect on bit 3. However, with less protection, bit 1 and bit 2 may become vulnerable to received bit errors. From this, it may be noted that if the SNR is marginally sufficient for error free communications for symmetric modulation, making the constellation more asymmetric may actually decrease performance. At SNR=10 dB, for $\beta$=0.5, bit 1, bit 2, and bit 3 encounter several bit errors. For $\beta$=0.4 and $\beta$=0.3, bit 2 has approximately the same BER. However, bit 1 is received with significantly more bit errors and bit 3 is received error-free. At SNR<10 dB, a comparable trend is observed. For the asymmetric modulations, bit 3 is more protected than bit 2, and bit 2 is more protected than bit 1. As the constellation becomes more asymmetric, the UEP difference between bit 1, bit 2, and bit 3 becomes larger. At SNR=1 dB, the BER is poor for all $\beta$ values tested. At this SNR, approximately half of all the received bits for all bit classes are erroneous. However, for $\beta$=0.4 and $\beta$=0.3, bit 3 has fewer errors than bit 2, and bit 2 has fewer errors than bit 1. Table 2, shown below, lists the BERs recorded for each case tested for 8-PSK.

TABLE 2

BER measured over the air for 8 PSK for an attenuated path loss channel.

| SNR | $\beta = 0.5$ | | | $\beta = 0.4$ | | | $\beta = 0.3$ | | |
|---|---|---|---|---|---|---|---|---|---|
| (dB) | Bit 1 | Bit 2 | Bit 3 | Bit 1 | Bit 2 | Bit 3 | Bit 1 | Bit 2 | Bit 3 |
| 20 | 0.00E+00 | 0.00E+00 | 0.00E+00 | 0.00E+00 | 0.00E+00 | 0.00E+00 | 0.00E+00 | 00.00E+00 | 0.00E+00 |
| 15 | 0.00E+00 | 0.00E+00 | 0.00E+00 | 2.72E−04 | 1.28E−05 | 0.00E+00 | 1.31E−02 | 5.92E−06 | 0.00E+00 |
| 10.5 | 2.44E−04 | 1.26E−04 | 1.23E−04 | 1.78E−03 | 2.40E−04 | 7.57E−06 | 4.83E−02 | 3.41E−04 | 0.00E+00 |
| 6 | 1.47E−01 | 8.72E−02 | 8.34E−02 | 1.39E−01 | 1.44E−02 | 5.35E−04 | 1.33E−01 | 4.42E−03 | 0.00E+00 |
| 3 | 4.98E−01 | 5.01E−01 | 5.01E−01 | 4.24E−01 | 4.69E−01 | 4.62E−02 | 2.59E−01 | 3.49E−02 | 4.80E−04 |
| 1 | 5.01E−01 | 5.03E−01 | 5.04E−01 | 4.93E−01 | 5.01E−01 | 5.00E−01 | 4.10E−01 | 2.89E−01 | 2.11E−01 |

Figure 8:
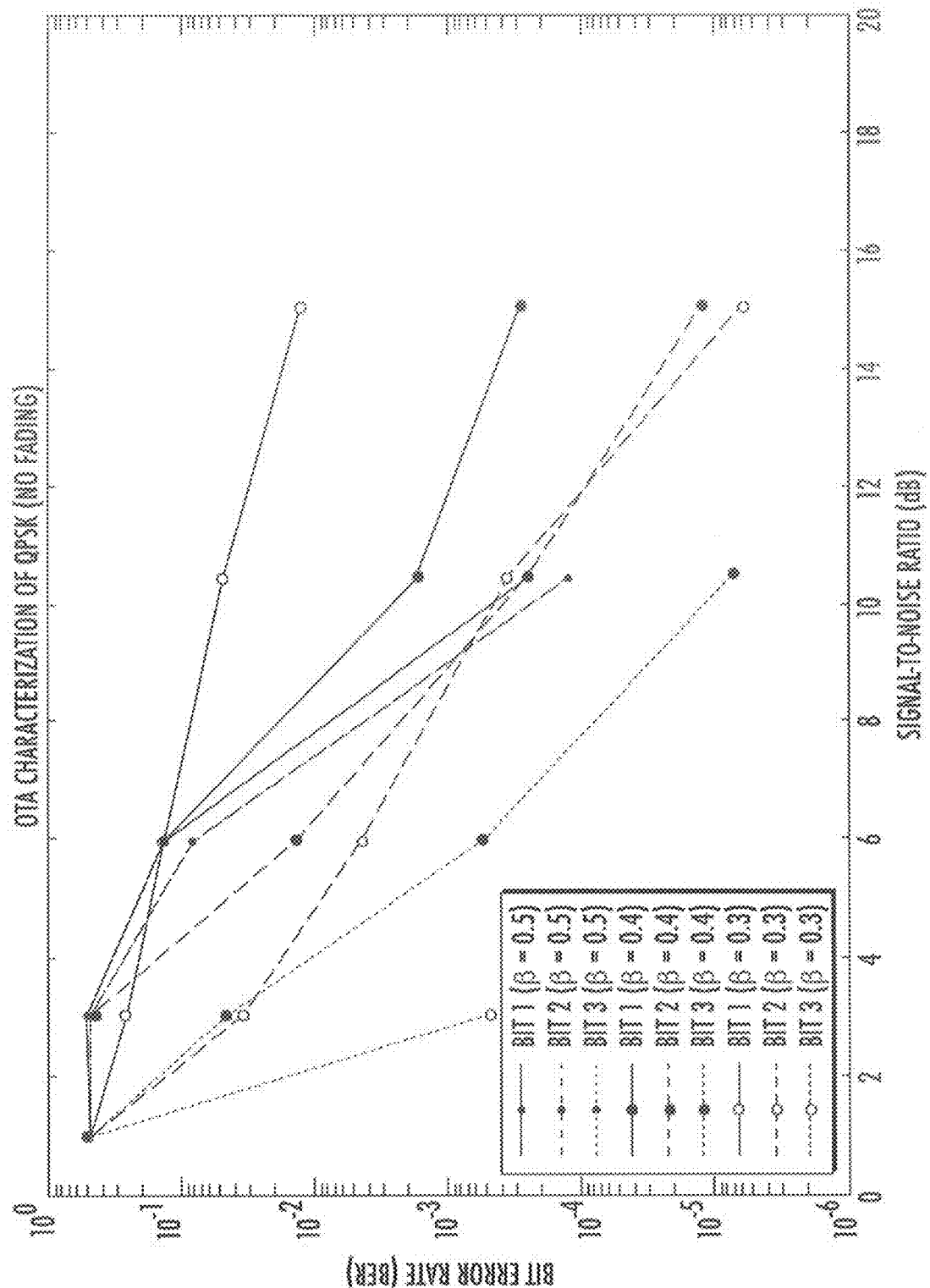
FIG. 8 is a graph that illustrates the over-the-air BER characterization of 8-PSK (no fading).

FIG. 8 is a graph that illustrates the over-the-air BER characterization of 8-PSK (no fading).

FIGS. 9A and 9B illustrate the received I-Q constellation graph and thumbnail images at SNR=6 dB for 8-PSK. As shown, FIG. 9A illustrates a received I-Q constellation graph and thumbnail images 801, 803, and 805 for symmetric 8-PSK, $\beta$=0.5. FIG. 9B illustrates a received I-Q constellation graph and thumbnail images 804, 806, and 808 for Asymmetric 8-PSK, $\beta$=0.3 (SNR=6 dB). In FIGS. 9A and 9B, from the I-Q constellation graphs, it may be noted that the received constellation using asymmetric modulation 03=0.3) (FIG. 9B) is less affected by the attenuation than the symmetric modulation ($\beta$=0.5) (FIG. 9A). Consequently, the thumbnail images 804, 806, and 808, received using asymmetric modulation, may have better perceived quality than the thumbnail images 801, 803, and 805 of the symmetric modulation. While apparent for bit 1, the improvement is evident for thumbnails representing bit 2 (806) and bit 3 (808). For the asymmetric modulation, in all but the most unacceptable circumstances, frequency and phase lock is preserved because the most protected bit stream is easily demodulated.

For 16-QAM, at SNR=20 dB, the BER for all 13 values is zero. For β=0.5, the BERs for bit 1, bit 2, bit 3, and bit 4 are roughly the same for a given SNR. As the constellation becomes more asymmetric, the UEP difference between bit 1, bit 2, bit 3 and bit 4 increases. At SNR=15 dB, for β=0.5, bit 1, bit 2, and bit 4 are received error-free. Bit 3 is received nearly error-free. At the same SNR, for β=0.4 and β=0.3, bit 2 and bit 4 are received error free. However, bit 1 and bit 3 encounter errors. For the asymmetric modulations, bit 2 and bit 4 receive additional protection at the expense of less protection for bit 1 and bit 3. However, bit 2 and bit 4 are already sufficiently protected. Therefore, the asymmetry has no effect on bit 2 and bit 4. However, with less protection, bit 1 and bit 3 are more vulnerable to corruption. Thus, if the SNR is sufficient for error free communications for symmetric modulation, making the constellation more asymmetric may decrease performance. At SNR=10 dB, for β=0.5, bit 1, bit 2, bit 3, and bit 4 encounter several bit errors. For β=0.4 and β=0.3, bit 1 and bit 3 have slightly fewer bit errors. However, bit 2 and bit 4 are received error-free. At SNR<10 dB, an analogous trend is observed. For the asymmetric modulations, bit 2 and bit 4 are more protected than bit 1 and bit 3. As the constellation becomes more asymmetric, the UEP disparity becomes greater. At SNR=1 dB, the BER is unacceptable for all 13 values tested. At this SNR, approximately half of all the received bits for all bit classes are erroneous.

Table 3, shown below, lists the BERs recorded for each case tested for 16-QAM.

To study the effects of Rayleigh fading on AMM, the SNR resulting in error-free communications for symmetric and asymmetric modulation was determined. For all three modulations (QPSK, 8-PSK, and 16-QAM), the error-free SNR was established to be 20 dB. At SNR=15 dB, symmetric QPSK, 8-PSK, and 16-QAM are also error-free. In this section, symmetric and asymmetric constellations are evaluated under Rayleigh fading conditions with SNR equal to 15 and 20 dB. By performing the characterization at this SNR, it may be assured that the major contributor to degradation is Rayleigh fading and not some other phenomena. For each modulation mode, the performance is evaluated for symmetric modulation with no fading, symmetric modulation with Rayleigh fading, and asymmetric modulation with Rayleigh fading.

For symmetric and asymmetric modulations at SNR=20 dB, devoid of fading, no bit errors are received. With fading, many errors are received. However, the number of errors received using asymmetric modulations is substantially less than that of symmetric modulations. In most cases, using asymmetric modulations reduces the number of bit errors by at least an order of magnitude. In some cases, the asymmetric modulations deliver error-free communications in the presence of fading. As illustrated in FIGS. 12A-12C and 13A-13C in comparison to the received thumbnails using symmetric modulation under fading conditions, the perceived quality of the received thumbnails using asymmetric modulation under fading conditions is substantially improved.

TABLE 3

BER measured over the air for 16-QAM for an attenuated path loss channel.

| SNR (dB) | β = 0.5 | | | | β = 0.4 | | | | β = 0.3 | | | |
|---|---|---|---|---|---|---|---|---|---|---|---|---|
| | Bit 1 | Bit 2 | Bit 3 | Bit 4 | Bit 1 | Bit 2 | Bit 3 | Bit 4 | Bit 1 | Bit 2 | Bit 3 | Bit 4 |
| 20 | 0.00E+00 | 0.00E+00 | 0.00E+00 | 0.00E+00 | 0.00E+00 | 0.00E+00 | 0.00E+00 | 0.00E+00 | 0.00E+00 | 0.00E+00 | 0.00E+00 | 0.00E+00 |
| 15 | 0.00E+00 | 0.00E+00 | 6.85E−07 | 0.00E+00 | 3.07E−06 | 0.00E+00 | 1.84E−05 | 0.00E+00 | 1.41E−04 | 0.00E+00 | 3.49E−04 | 0.00E+00 |
| 10.5 | 6.30E−04 | 5.00E−04 | 7.53E−04 | 4.96E−04 | 5.08E−04 | 3.72E−06 | 8.42E−04 | 8.46E−06 | 4.22E−03 | 0.00E+00 | 6.21E−03 | 0.00E+00 |
| 6 | 5.32E−02 | 5.01E−02 | 5.41E−02 | 5.06E−02 | 2.23E−02 | 1.81E−03 | 2.36E−02 | 1.01E−03 | 3.24E−02 | 3.88E−05 | 3.68E−02 | 3.95E−05 |
| 3 | 3.23E−01 | 4.58E−01 | 3.21E−01 | 4.56E−01 | 2.76E−01 | 3.31E−01 | 2.75E−01 | 3.29E−01 | 2.75E−01 | 5.99E−02 | 2.72E−01 | 5.92E−02 |
| 1 | 4.13E−01 | 5.02E−01 | 4.13E−01 | 5.0E−01 | 4.15E−01 | 4.98E−01 | 4.15E−01 | 4.98E−01 | 4.18E−01 | 4.83E−01 | 4.18E−01 | 4.82E−01 |

Figure 10:
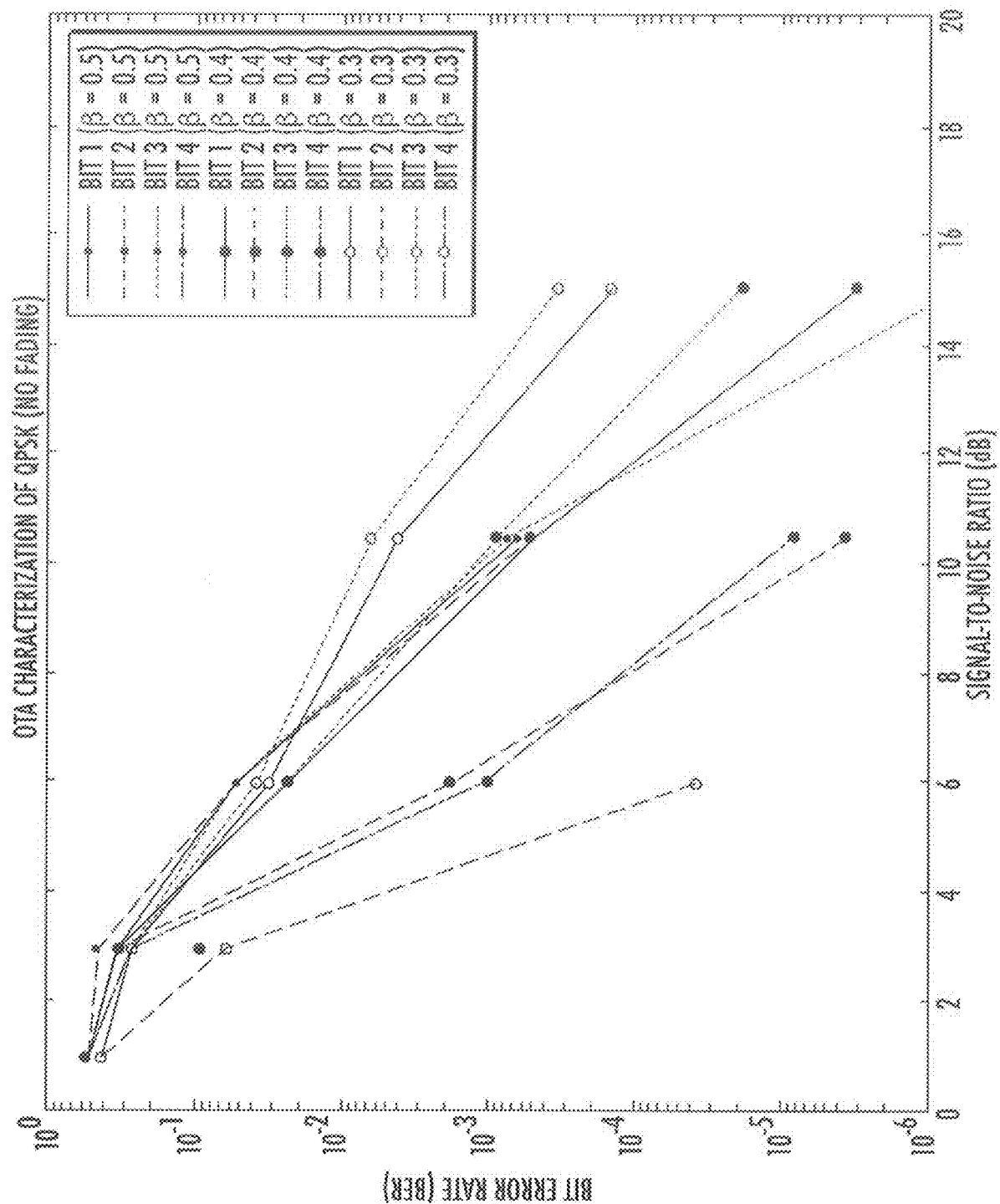
FIG. 10 illustrates the over-the-air BER characterization of symmetric and asymmetric 16-QAM FIGS. 11A and 11B respectively illustrate the received I-Q constellation graph and before-and-after thumbnail images at SNR=6 dB for symmetric and asymmetric 16-QAM.
Figure 11A:
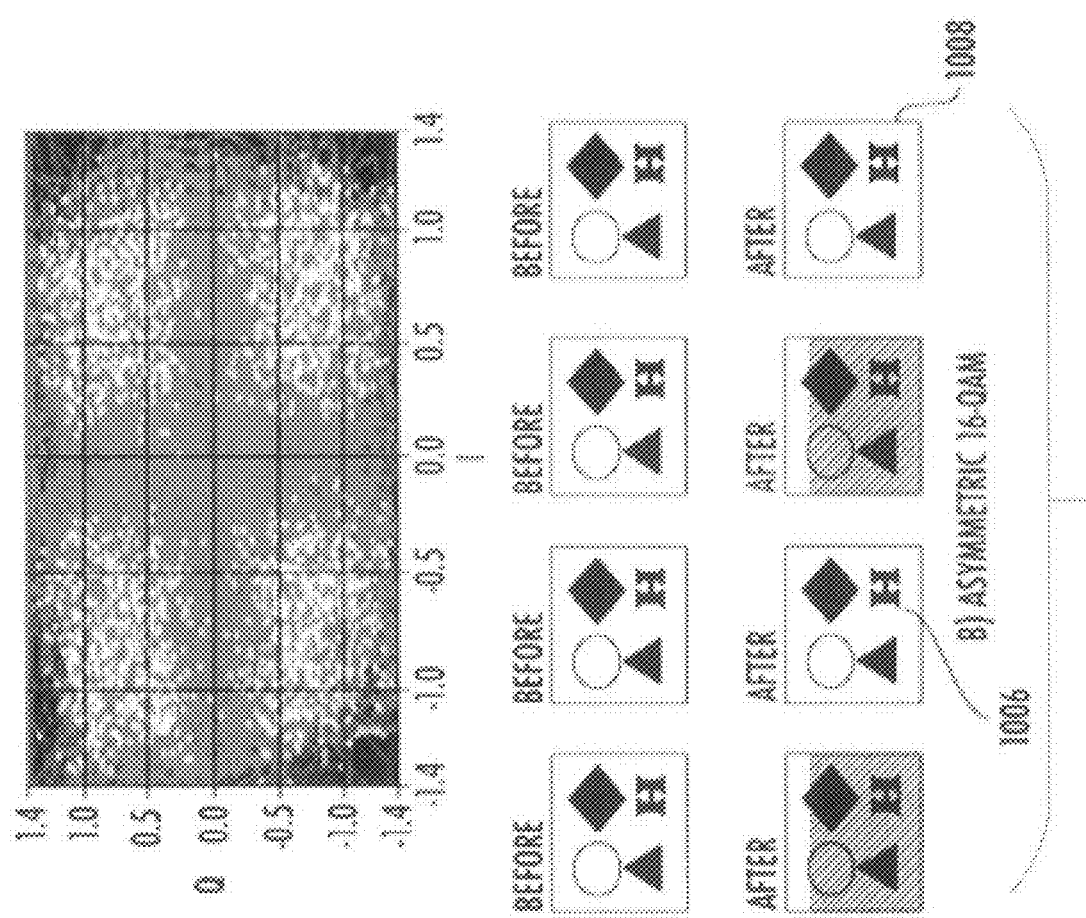
Figure 11B:
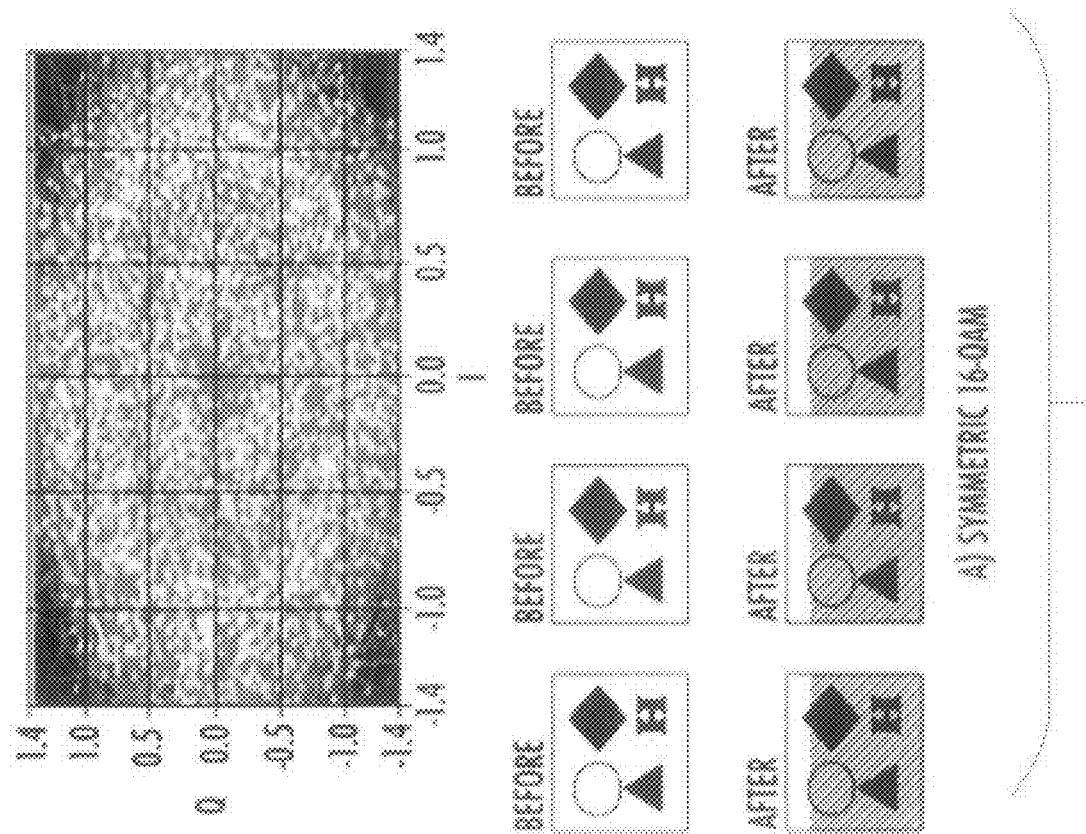

FIG. 10 illustrates the over-the-air BER characterization of symmetric and asymmetric 16-QAM. FIGS. 11A and 11B respectively illustrate the received I-Q constellation graph and before-and-after thumbnail images at SNR=6 dB for symmetric and asymmetric 16-QAM. As shown, FIGS. 11A and 11B illustrate a received I-Q constellation graph and thumbnail images for a) symmetric 16-QAM, β=0.5 (FIG. 11A), and b) symmetric 16-QAM, β=0.3 (SNR=6 dB) (FIG. 4B). In FIG. 11B, from the I-Q constellation graph, it may be observed that the received constellation using asymmetric modulation (β=0.3) is less affected by the attenuation than the symmetric modulation 03=0.5) (as shown in FIG. 11A). Consequently, the thumbnail images received using asymmetric modulation have better perceived quality than those of the symmetric modulation. While obvious for bit 1 and bit 3, the enhancement is more apparent for the thumbnails representing bit 2 (1006) and bit 4 (1008). For the asymmetric constellation, in all but the noisiest conditions, frequency and phase lock is sustained because the most protected bit stream is easily demodulated.

Figure 12A:
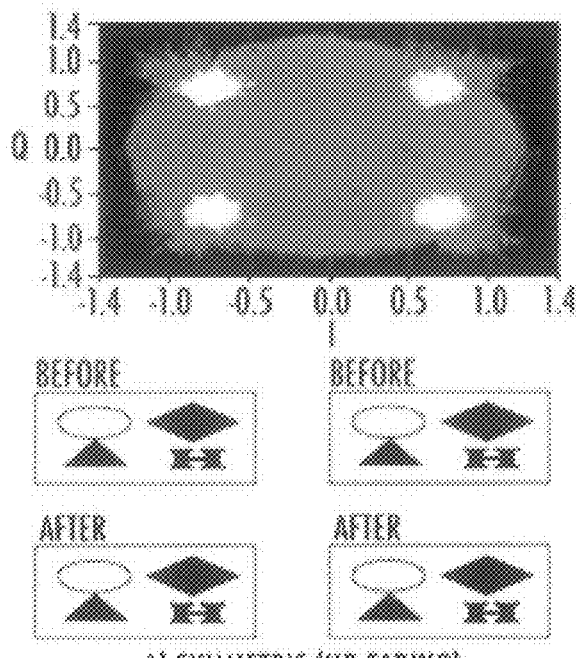
FIGS. 12A, 12B, and 12C respectively illustrate a received I-Q constellation graph and thumbnail images for a) symmetric QPSK with no fading, β=0.5; b) symmetric QPSK with fading, β=0.5; and c) asymmetric QPSK with Fading, β=0.3 (SNR=20 dB).
Figure 12B:
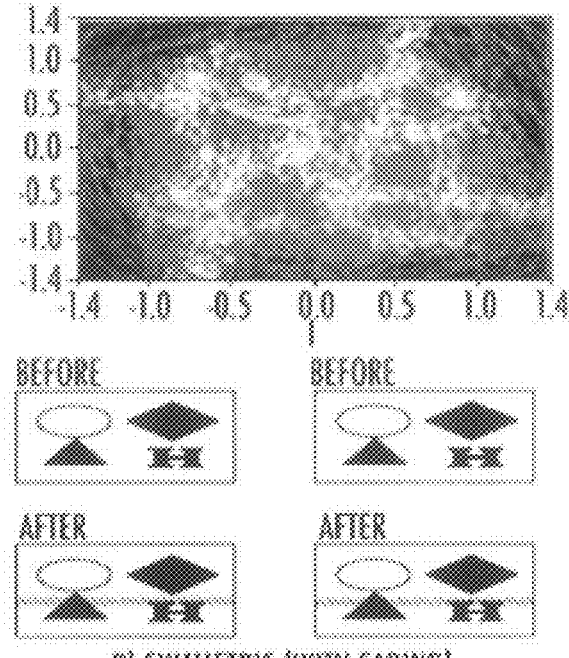
Figure 12C:
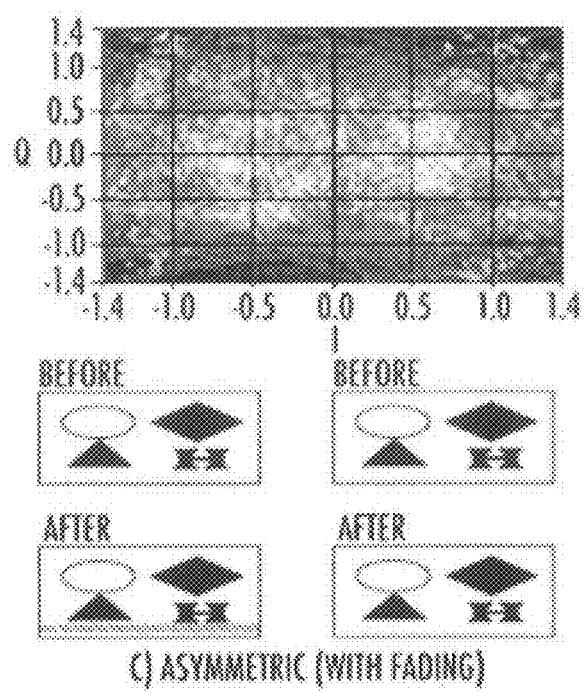

As shown, FIGS. 12A-12C illustrate a received I-Q constellation graph and thumbnail images for a) symmetric QPSK with no fading, β=0.5 (FIG. 12A); b) symmetric QPSK with fading (FIG. 12B), β=0.5; and c) asymmetric QPSK with Fading, β=0.3 (SNR=20 dB) (FIG. 12C).

Figure 13A:
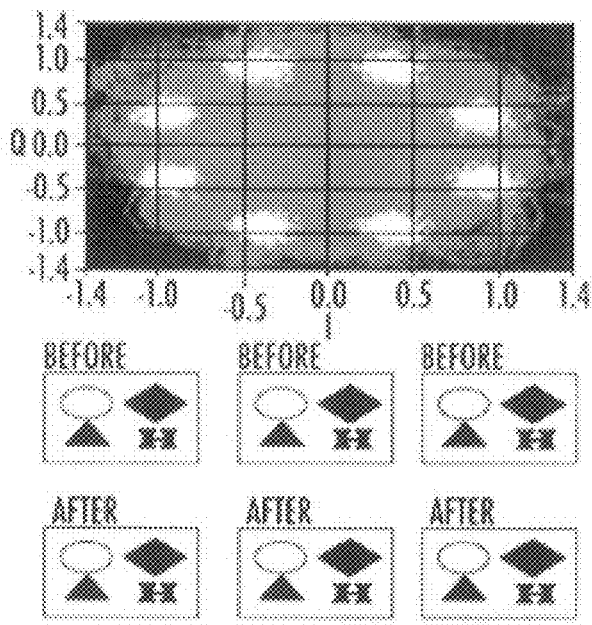
FIGS. 13A, 13B, and 13C respectively illustrate a received I-Q constellation graph and thumbnail images for a) symmetric 8-PSK with no fading, β=0.5; b) symmetric 8-PSK with fading, β=0.5; and c) asymmetric 8-PSK with fading, β=0.3 (SNR=20 dB).
Figure 13B:
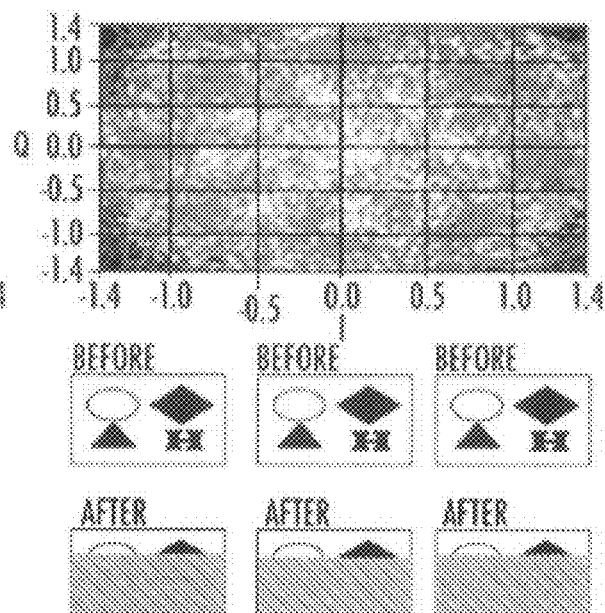
Figure 13C:
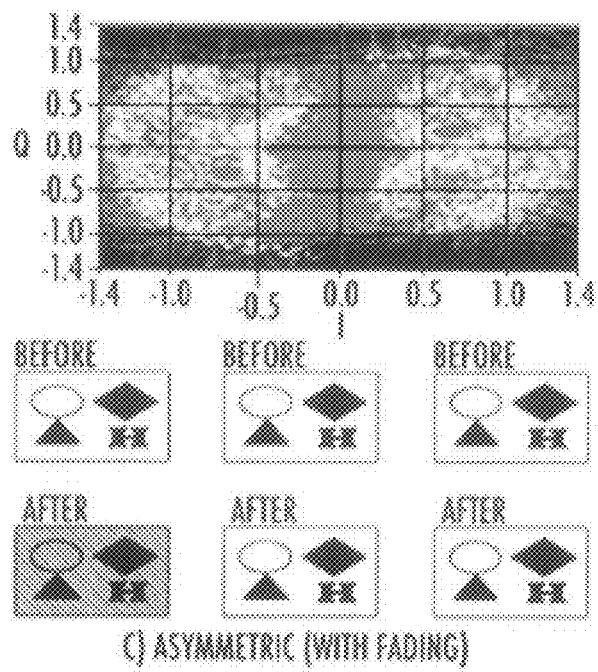

As shown, FIGS. 13A-13C illustrate a received I-Q constellation graph and thumbnail images for a) symmetric 8-PSK with no fading, β=0.5 (FIG. 13A); b) symmetric 8-PSK with fading, β=0.5 (FIG. 13B); and c) asymmetric 8-PSK with fading, β=0.3 (SNR=20 dB) (FIG. 13C).

For 8-PSK and 16-QAM, with symmetric modulation under fading, the received thumbnails are completely unrecognizable. With asymmetric modulation, the quality is substantially enhanced. Tables 4, 5, and 6 include the BER captured over-the-air for each modulation mode under Rayleigh fading conditions. Table 4, shown below, illustrates the BER measured over the air for QPSK for a Rayleigh fading channel.

TABLE 4

BER measured over the air for QPSK for a Rayleigh fading channel.

| Fading | SNR (dB) | β = 0.5 | | β = 0.4 | | β = 0.3 | |
|---|---|---|---|---|---|---|---|
| | | Bit 1 | Bit 2 | Bit 1 | Bit 2 | Bit 1 | Bit 2 |
| Rayleigh | 20 | 3.49E−03 | 5.46E−03 | 1.66E−04 | 8.19E−03 | 3.25E−04 | 0.00E+00 |
| Fading | 15 | 1.59E−01 | 1.47E−01 | 1.22E−01 | 1.41E−01 | 3.38E−02 | 8.24E−02 |
| No | 20 | 0.00E+00 | 0.00E+00 | 0.00E+00 | 0.00E+00 | 0.00E+00 | 0.00E+00 |
| Fading | 15 | 0.00E+00 | 0.00E+00 | 0.00E+00 | 0.00E+00 | 0.00E+00 | 0.00E+00 |

Table 5, shown below, illustrates the BER measured over the air for 8-PSK for a Rayleigh fading channel.

TABLE 5

BER measured over the air for 8-PSK for a Rayleigh fading channel.

| Fading | SNR (dB) | β = 0.5 | | | β = 0.4 | | | β = 0.3 | | |
|---|---|---|---|---|---|---|---|---|---|---|
| | | Bit 1 | Bit 2 | Bit 3 | Bit 1 | Bit 2 | Bit 3 | Bit 1 | Bit 2 | Bit 3 |
| Rayleigh | 20 | 8.10E−02 | 4.23E−02 | 4.12E−02 | 3.25E−02 | 7.22E−03 | 3.17E−03 | 1.26E−01 | 3.56E−03 | 0.00E+00 |
| Fading | 15 | 3.33E−01 | 2.90E−01 | 2.90E−01 | 1.71E−01 | 2.05E−01 | 1.93E−01 | 1.84E−01 | 1.00E−01 | 8.07E−02 |
| No | 20 | 0.00E+00 | 0.00E+00 | 0.00E+00 | 0.00E+00 | 0.00E+00 | 0.00E+00 | 0.00E+0 | 0.00E+00 | 0.00E+00 |
| Fading | 15 | 0.00E+00 | 0.00E+00 | 0.00E+00 | 2.72E−04 | 1.28E−05 | 0.00E+00 | 1.31E−02 | 5.92E−06 | 0.00E+00 |

Table 6, shown below, illustrates the BER measured over the air for 16-QAM for a Rayleigh fading channel.

TABLE 6

BER measured over the air for 16-QAM for a Rayleigh fading channel.

| Fading | SNR (dB) | β = 0.5 | | | | β = 0.4 | | | |
|---|---|---|---|---|---|---|---|---|---|
| | | Bit 1 | Bit 2 | Bit 3 | Bit 4 | Bit 1 | Bit 2 | Bit 3 | Bit 4 |
| Rayleigh | 20 | 6.75E−02 | 7.27E−02 | 6.87E−02 | 7.56E−02 | 2.73E−02 | 1.53E−02 | 2.95E−02 | 1.63E−02 |
| Fading | 15 | 3.85E−01 | 4.96E−01 | 3.86E−01 | 4.97E−01 | 3.37E−01 | 3.83E−01 | 3.40E−01 | 3.86E−01 |
| No | 20 | 0.00E+00 | 0.00E+00 | 0.00E+00 | 0.00 E+00 | 0.00E+00 | 0.00E+00 | 0.00E+00 | 0.00E+00 |
| Fading | 15 | 0.00E+00 | 0.00E+00 | 6.85E−07 | 0.00E+00 | 3.07E−06 | 0.00E+00 | 1.84E−05 | 0.00E+00 |

| Fading | SNR (dB) | β = 0.3 | | | |
|---|---|---|---|---|---|
| | | Bit 1 | Bit 2 | Bit 3 | Bit 4 |
| Rayleigh | 20 | 3.07E−02 | 3.33E−06 | 3.59E−02 | 6.59E−06 |
| Fading | 15 | 3.10E−01 | 2.22E−01 | 3.14E−01 | 2.24E−01 |
| No | 20 | 0.00E+00 | 0.00E+00 | 0.00E+00 | 0.00E+00 |
| Fading | 15 | 1.41E−04 | 0.00E+00 | 3.49E−04 | 0.00E+00 |

In summary, AMM may advantageously enhance signal acquisition (frequency and phase lock) because the most protected bit stream(s) is(are) easily demodulated. With asymmetric modulation, the most important bits are highly protected and may be demodulated under less favorable channel conditions relative to symmetric modulation. Thus, AMM for signal acquisition may substantially enhance the robustness of a communications system.

Using FEC for UEP is only useful to higher layers after the transmitted symbols have been demodulated into bits at the physical layer. Consequently, FEC may be useless and may not be leveraged unless signal acquisition is successful. Only UEP via AMM may be used to increase the likelihood of signal acquisition without using additional power (which is undesirable in mobile wireless communications).

Example aspects discussed herein may be implemented as a series of modules, either functioning alone or in concert with physical electronic and computer hardware devices. Example techniques discussed herein may be implemented as a program product comprising a plurality of such modules, which may be displayed for a user. As used herein, the term "module" generally refers to a software module. A module may be implemented as a collection of routines and data structures that performs particular tasks or implements a particular abstract data type. Modules generally are composed of two parts. First, a software module may list the constants, data types, variables, and routines that may be accessed by other modules or routines. Second, a module may be configured as an implementation, which may be private (i.e., accessible only to the module), and which contains the source code that actually implements the routines or subroutines upon which the module is based. Such modules may be utilized separately and/or together locally and/or remotely to form a program product thereof, that may be implemented through non-transitory machine-readable recordable media.

Various storage media, such as magnetic computer disks, optical disks, and electronic memories, as well as non-transitory computer-readable storage media and computer program products, can be prepared that can contain information that can direct a device, such as a micro-controller, to implement the above-described systems and/or methods. Once an appropriate device has access to the information and programs contained on the storage media, the storage media can provide the information and programs to the device, enabling the device to perform the above-described systems and/or methods.

For example, if a computer disk containing appropriate materials, such as a source file, an object file, or an executable file, were provided to a computer, the computer could receive the information, appropriately configure itself and perform the functions of the various systems and methods outlined in the diagrams and flowcharts above to implement the various functions. That is, the computer could receive various portions of information from the disk relating to different elements of the above-described systems and/or methods, implement the individual systems and/or methods, and coordinate the functions of the individual systems and/or methods.

Features discussed herein are provided as example techniques that may be implemented in many different ways that may be understood by one of skill in the art of computing, without departing from the discussion herein. Such features are to be construed only as example features, and are not intended to be construed as limiting to only those detailed descriptions.

FIG. 14 is a flowchart illustrating example operations of the system of FIGS. 2-3, according to example embodiments. As shown in the example of FIG. 14, at a network receiver, a first receiver adjustment value corresponding to a first transmitter adjustment value may be received from a transmitter (1502).

The network receiver may be configured to demodulate signals received from the transmitter, in accordance with an asymmetric signal constellation, based on the first transmitter adjustment value (1504). At the network receiver, a transmission may be received from the transmitter (1506). The received transmission may be demodulated, based on demodulating using the received first receiver adjustment value corresponding to the first transmitter adjustment value (1508).

A second receiver adjustment value corresponding to a second transmitter adjustment value may be received, the second transmitter adjustment value based on increasing asymmetry of the asymmetric signal constellation (1510). Signal acquisition may be improved by demodulating, at the network receiver, transmissions, based on demodulating using the received second receiver adjustment value (1512). For example, the network receiver may be reconfigured to demodulate received transmissions in accordance with the second receiver adjustment value.

Configuring the network receiver may, for example include a) modifying a shape of a current decision region in use for demodulating received transmissions at the network receiver; b) modifying a shape of a current signal constellation in use for demodulating received transmissions at the network receiver; c) configuring the network receiver to receive the transmission in accordance with adaptive multiresolution modulation; d) modifying a size of a current decision region in use for demodulating received transmissions at the network receiver; and e) modifying a shape of a current signal constellation in use for demodulating received transmissions at the network receiver, to the asymmetric signal constellation.

One skilled in the art of computing will appreciate that many other types of techniques may be used for examples discussed herein, without departing from the discussion herein. Features discussed herein are provided as example techniques that may be implemented in many different ways that may be understood by one of skill in the art of computing, without departing from the discussion herein. Such features are to be construed only as example features, and are not intended to be construed as limiting to only those detailed descriptions.

For example, the one or more processors (e.g., hardware device processors) may be included in at least one processing apparatus. One skilled in the art of computing will understand that there are many configurations of processors and processing apparatuses that may be configured in accordance with the discussion herein, without departing from such discussion.

In this context, a "component" or "module" may refer to instructions or hardware that may be configured to perform certain operations. Such instructions may be included within component groups of instructions, or may be distributed over more than one group. For example, some instructions associated with operations of a first component may be included in a group of instructions associated with operations of a second component (or more components). For example, a "component" herein may refer to a type of functionality that may be implemented by instructions that may be located in a single entity, or may be spread or distributed over multiple entities, and may overlap with instructions and/or hardware associated with other components.

In this context, a "memory" may include a single memory device or multiple memory devices configured to store data and/or instructions. Further, the memory may span multiple distributed storage devices. Further, the memory may be distributed among a plurality of processors. One skilled in the art of computing will understand that there may be many ways of accomplishing the features discussed herein.

It will be understood that many additional changes in the details, materials, steps and arrangement of parts, which have been herein described and illustrated to explain the nature of the invention, may be made by those skilled in the art within the principle and scope of the invention as expressed in the appended claims.

We claim:

1. A method comprising:
   transmitting, at a transmitter in a network, transmissions in accordance with an asymmetric signal constellation;
   detecting a channel impairment in the network;
   in response to detecting the channel impairment, determining a transmitter adjustment value for adjusting modulations at the transmitter, the transmitter adjustment value determined to increase asymmetry of the asymmetric signal constellation;
   improving signal acquisition by transmitting, at the transmitter, transmissions, based on transmitting using the determined transmitter adjustment value; and
   wherein increasing the asymmetry of the asymmetric signal constellation includes modifying a size of a current signal constellation in use for transmitting at the transmitter.

2. The method of claim 1, wherein improving the signal acquisition includes transmitting, at the transmitter, transmissions, based on transmitting using the determined transmitter adjustment value, in lieu of increasing power.

3. The method of claim 1, wherein the transmitter transmits in accordance with adaptive multiresolution modulation.

4. The method of claim 1, wherein the asymmetric signal constellation is based on a representation of signals modulated by a digital modulation scheme.

5. A method comprising:
receiving, at a network receiver, from a transmitter, a first receiver adjustment value corresponding to a first transmitter adjustment value;
configuring the network receiver to demodulate signals received from the transmitter, in accordance with an asymmetric signal constellation, based on the first transmitter adjustment value;
receiving, at the network receiver, a transmission from the transmitter;
demodulating the received transmission, based on demodulating using the received first receiver adjustment value corresponding to the first transmitter adjustment value;
receiving a second receiver adjustment value corresponding to a second transmitter adjustment value, the second transmitter adjustment value based on increasing asymmetry of the asymmetric signal constellation; and
improving signal acquisition by demodulating, at the network receiver, transmissions, based on demodulating using the received second receiver adjustment value.

6. The method of claim 5, further comprising:
reconfiguring the network receiver to demodulate received transmissions in accordance with the second receiver adjustment value.

7. The method of claim 5, wherein configuring the network receiver includes modifying a shape of a current decision region in use for demodulating received transmissions at the network receiver.

8. The method of claim 5, wherein configuring the network receiver includes modifying a shape of a current signal constellation in use for demodulating received transmissions at the network receiver.

9. The method of claim 5, wherein configuring the network receiver includes configuring the network receiver to receive the transmission in accordance with adaptive multiresolution modulation.

10. The method of claim 5, wherein configuring the network receiver includes modifying a size of a current decision region in use for demodulating received transmissions at the network receiver.

11. The method of claim 5, wherein configuring the network receiver includes modifying a shape of a current signal constellation in use for demodulating received transmissions at the network receiver, to the asymmetric signal constellation.

12. A system comprising:
a transmitter in a network, the transmitter including:
at least one hardware device processor; and
a non-transitory computer-readable storage medium storing instructions that are executable by the at least one hardware device processor to:
transmit transmissions in accordance with an asymmetric signal constellation;
detect a channel impairment in the network;
in response to detecting the channel impairment, determine a transmitter adjustment value for adjusting modulations at the transmitter, the transmitter adjustment value determined to increase asymmetry of the asymmetric signal constellation by modifying a size of a current signal constellation in use for transmitting at the transmitter; and
improve signal acquisition by transmitting transmissions, based on transmitting using the determined transmitter adjustment value.

13. The system of claim 12, wherein improving the signal acquisition includes transmitting, at the transmitter, transmissions, based on transmitting using the determined transmitter adjustment value, in lieu of increasing power.

14. The system of claim 12, wherein the transmitter transmits in accordance with adaptive multiresolution modulation.

15. The system of claim 12, wherein the asymmetric signal constellation is based on a representation of signals modulated by a digital modulation scheme.

* * * * *